(12) United States Patent
Pasternak et al.

(10) Patent No.: US 10,406,422 B1
(45) Date of Patent: Sep. 10, 2019

(54) SPORTS COMMUNICATION AND COLLABORATIVE PLATFORM

(71) Applicants: Jan Pasternak, Houston, TX (US); Roger Lee Workman, Houston, TX (US); Suzanne R. Levine, Houston, TX (US); Deborah S. Wernet, Houston, TX (US)

(72) Inventors: Jan Pasternak, Houston, TX (US); Roger Lee Workman, Houston, TX (US); Suzanne R. Levine, Houston, TX (US); Deborah S. Wernet, Houston, TX (US)

( * ) Notice: Subject to any disclaimer, the term of this patent is extended or adjusted under 35 U.S.C. 154(b) by 0 days.

(21) Appl. No.: 16/250,565

(22) Filed: Jan. 17, 2019

Related U.S. Application Data

(63) Continuation-in-part of application No. 15/923,857, filed on Mar. 16, 2018, now Pat. No. 10,207,173.

(60) Provisional application No. 62/488,485, filed on Apr. 21, 2017.

(51) Int. Cl.
*A63B 71/06* (2006.01)
*G06Q 20/36* (2012.01)

(52) U.S. Cl.
CPC ......... *A63B 71/0616* (2013.01); *G06Q 20/36* (2013.01)

(58) Field of Classification Search
CPC .................................................. A63B 71/0616
See application file for complete search history.

(56) References Cited

U.S. PATENT DOCUMENTS

| | | | |
|---|---|---|---|
| 2005/0021352 A1* | 1/2005 | Maierhofer | G06Q 10/06314 705/7.24 |
| 2007/0060328 A1* | 3/2007 | Zrike | G07F 17/3274 463/29 |
| 2008/0305867 A1* | 12/2008 | Guthrie | G06Q 10/10 463/29 |
| 2011/0320375 A1* | 12/2011 | Zrike | G06Q 10/107 705/319 |

* cited by examiner

*Primary Examiner* — David L Lewis
*Assistant Examiner* — Robert E Mosser
(74) *Attorney, Agent, or Firm* — Nolte Intellectual Property Law Group

(57) ABSTRACT

A sports communication and collaboration transactional platform with client devices engaging a network, and an administrative memory with processor, the memory having individual user information profiles; an authentication component; a tournament database model; a registration and ranking component; a financial component; an automatic team creation component; and an operational management component that automatically; creates a tournament play sequence, tracks and calculate results, and a ranking for each individual user information profile the platform communicating via the network to financial and medical servers.

16 Claims, 7 Drawing Sheets

SPORTS COMMUNICATION AND COLLABORATIVE PLATFORM

CROSS REFERENCE TO RELATED APPLICATION

The present continuation in part application claims priority to and the benefit of U.S. Provisional Patent Application Ser. No. 62/488,485 filed on Apr. 21, 2017, entitled "COMPUTER SYSTEM FOR PROVIDING A SPORTS COMMUNICATION AND COLLABORATION PLATFORM" and co-pending Non-Provisional patent application Ser. No. 15/923,857 and Non-Provisional patent application Ser. No. 16/230,865. These references are hereby incorporated in its entirety.

FIELD

The present embodiment generally relates to an improved sports communication and collaboration platform that allows users to interact with automatic check in and provide financial data.

BACKGROUND

A need exists for an easy to use sports platform that provides automatic check in and scheduling, financial collection and dispersion and mapping for a variety of competitors for tournaments or events simultaneously and connects to a plurality of client device simultaneously.

The present embodiments meet these needs.

BRIEF DESCRIPTION OF THE DRAWINGS

The detailed description will be better understood in conjunction with the accompanying drawings as follows.

Figure 1:
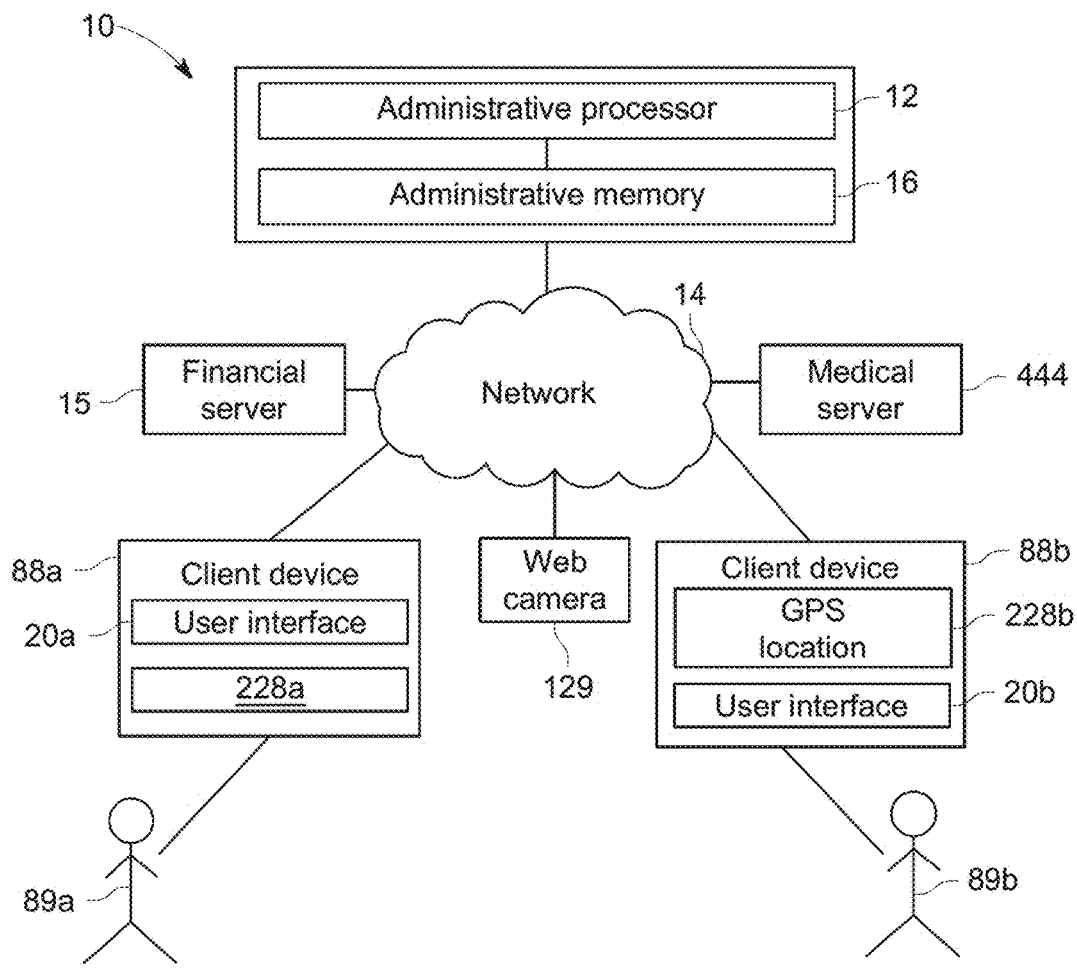
FIG. 1 depicts a diagram of equipment usable in the platform.

The present embodiments are detailed below with reference to the listed Figures.

DETAILED DESCRIPTION OF THE EMBODIMENTS

Before explaining the present system in detail, it is to be understood that the system is not limited to the particular embodiments and that it can be practiced or carried out in various ways.

The invention relates to a computer assisted sports communication and collaboration transactional platform with client devices engaging a network, and an administrative memory with processor, the memory having individual user information profiles; an authentication component; a tournament database model; a registration and ranking component; a financial component; an automatic team creation component; and an operational management component that automatically:creates a tournament play sequence, track can calculate results and a ranking for each individual user information profile.

A benefit of the system is that it helps the elderly by increasing participation by the elderly in healthy activities such as pickleball, by providing an easy to access, easy to use and map system to identify locations of pickleball tournaments and see their ranking on a national scale.

Another benefit of the system is that in its use, the users experience a sense of community and have travel opportunities for a purpose during retirement which is needed for a healthy end of life.

Automatic advance registration minimizes the amount of the amount of time to register reduces stress, and the chance for a heart attack based on anxiety. The advance registration enables people to prepare in advance more effectively and train preventing staying up all night to register for a sports tournament like pickleball.

When this system is used for the sport of pickleball, both the elderly, and the young, and all ages in between can experience play of pickleball easily, having fun, and experiencing a team environment that is inexpensive.

The system is built to take advantage of mobile computing and social media connections.

The system provides opportunity for tournament organizers to increase revenue by selling advertising to targeted markets.

The system improves the utilization of recreational facilities by providing easy to use scheduling that can be viewed on a cellular phone or other mobile client device by many users simultaneously.

The system stops death of users by providing a consistent and regular schedule of play which minimizes needless driving around.

The following terms are used herein:

The term "administrative processor" can refer to a computer component that has processing capability and bidirectional communication. The administrative processor can be installed in a server, a processor that is virtual or cloud based.

The term "administrative fee" can refer to a fee for use of the sports communication and collaboration platform. The administrative fee can refer to a fee for advertising to players using the sports communication and collaboration platform. Administrative fee can refer to a fee collected, like a commission, for allowing a vendor to sell equipment to individual users. The administrative fee can include an administrative credit card charge related to collection of administrative fees.

The term "administrative memory" can refer to data storage which can be a jump drive, cloud based drive, hard drive, or other solid state memory/

The term "age level" refers to a classification level at which an age of a player is associated, such as age level 1 is for players 12 to 16 years old.

The term "an authentication component" which is used to verify each individual user information profiles in the administrative memory refers to a matching system which confirms the email of a user is the same as in the individual user information profiles. Authentication occurs using computer instructions stored in the administrative memory with the administrative processor which can be modified to select another individual user information profiles component, such as cell phone, membership number, birthdates or any other selected individual user information profiles component. The authentication component can be a two factor verification system which can include a first log in to the administrative processor which then transmits a second message to a second device with a code to verify that the user matches individual user information profiles stored in the administrative memory.

The term "client device" as used herein can refer to a mobile phone, laptop, tablet, wearable computer or wristwatch with processing and memory and a display and can identify itself with a unique address and a GPS location and communicate via a network.

The term "clinic" refers to an instructional event with a relationship between students and a coach.

The term "coach" such as for Pickleball, is a person that provides advice and training competitors to improve their performance skills in the game.

The term "competition" as used herein refers to a set of rules against which individuals or groups of individuals compare themselves to in order to be ranked higher or lower than other individuals in the same activity. A competition can be a pickleball tournament or a debate tournament, or a chess tournament, or a swimming meet.

The term "certification course" for a user to become an official refers to coursework and tests that teach a user rules and regulations of a sport and verifies that the user has comprehended the rules and regulations. In some embodiments, the sport could be an activity, such as a speech contest at a local high school.

The term "cryptocurrency" as used herein refers to a digital or virtual currency that uses cryptography for security and can be used for payment of tournament costs, such as bitcoin for tournament registration.

The term "digital financial instruments" refers to credit cards, debit cards, gift cards, and prepaid credit cards, loyalty cards configured to convert loyalty points to money; wire transfers, such as paying with 500,000 loyalty points and 1 bit coin to cover all tournament fees for a team for 2 years.

The term "digital wallet" refers to a protocol that enables financial transactions to flow from a player wallet or a team wallet, such as in a mobile device like a cell phone, having an application that tracks funds of the player and/or a team, and transfers the funds to or from a tournament organizer of tournament play.

The term "estimator component" can refer to a component that estimates number of competitors that the tournament can support based on the number of resources.

The term "event" can refer to a gathering of people which requires registration and attendance, payment of a fee, and an activity in which the users participate, but specifically excludes competitions. An event may be a ceremony, such as an event of ritual significance, performed on a special occasion, a convention that has a certain result or goal or another gathering of individuals engaged in some common interest for a specific end result.

The term "fiat money" refers to inconvertible paper money made legal tender by a government decree, such as the Euro or the U.K. pound provided as payment for tournaments in the USA.

The term "financial component" can refer to the pricing event and registration fees payments. Also, the financial component collects payments from competitors, refunds of payments to competitors, and submits payments to third parties for services.

The term "financial institution" can refer to a bank, credit union, credit card company, financial company such as "Square"™ or investment management entity.

The term "funds" as used herein can refer to money to register for a tournament, register for a clinic, register for a workshop, pay for merchandise, such as a hat, a t-shirt and/or a bag, pay for a plurality of social events such as an awards banquet and can include donations such as cash contributions.

The term "individual user information profiles" can refer to a user name, a user address, a user email, a user gender, a user phone, a user club affiliation, a user ranking, a user tournament or event history, user funds paid and refunded, user club information, user tournament locations and schedules, user awards won, user Facebook and user social media contact information for log in, passwords, and security questions. User information can include information on each team that each user has played on.

The term "information" refers to information that is accessible to the user but excludes "User Information". Information can include upcoming tournament information, dates, times, locations, rules of play, rules for ranking, generic club information, and generate team information.

The term "locator feature" as used herein can be a feature that determines the location of user.

The term "network" can refer to a global communication network, a local area network, a satellite network, a cellular network, a fiber optic network or combinations thereof.

The term "operational fee" can refer to a fee for running a tournament. The operational fee can include an operational credit card charge or similar banking fee for use of credit cards to collect fees for running a tournament.

The term "ranking level" refers to a relationship between users based on performance.

The term "referee" as used herein is a type of official that interprets rules of the tournament.

The term "relationship database model which is the same element as "a tournament database model" refers to the collection of information necessary to run a competitive sporting event. a name of sport being played, a geographic location, a skill level for players of the tournament and; an age level for players of the tournament; and a fee for the tournament.

The term "schedules for a tournament" includes start times.

The term "scheduling component" can refer to a component that schedules the starting times of the competition based on the number of competitors in relation to the number of resources. The scheduling component also notifies the competitors of the status of each tournament, such as not limited to "running late" or "on time".

The term "team" refers to the matched groupings of users which are created by the administrative processor using the tournament database model and individual user information profiles. The matched groupings can be created based on preferences by a user. The matched groupings are created only after funds have transferred from a user to the tournament director. The matched grouping may occur automatically by the administrative processor using the tournament database model and individual user information profiles.

The term "team manager" refers to a person that manages many competitors and performs a function other than coaching, and can include handling money, scheduling play, arranging transportation and uniforms, and prize awards.

The term "tournament" refers to an event with multiple games wherein a plurality of competitors compete using preset rules and there is a winner and a loser.

The term "tournament organizer authorization" refers to an approval by a tournament organizer for a tournament or an event. The approval can be approval for age levels, ranking level or set up of a luncheon, all of which are classified before or during a tournament or event.

The term "transmission and display component" can refer to any component of the computer system that transmits and displays tournament play for a plurality of users simultaneously.

The term "user" refers to an official, a spectator, a competitor, a tournament organizer, and a competition organizer, a team of a local club, a local club, and a member of a local club, a national association, and a sponsor. A user can be a person or a company.

The term "user interface" refers to a man machine interface optionally through a touch screen that allows a user to input data, and access data and search for data with a query system. The interface can be an interface for the blind with accessibility features or an interface using voice recognition.

The term "user role" refers to a definition of who the user is relative to the event or completion, such as an official, a spectator, a competitor, a tournament organizer, a competition organizer, a team of a local club, a local club, a national association, and a sponsor.

The term "user's rights and responsibilities" refer to the access level to information contained in the system and the rules under which the user must act.

The term "user relationships" refers to relationships of depsentence or association is between two users. The user relationship is any of a broad class of relationships such as player and sponsor, club and official, or financial institution and club that involves dependence or interaction. In this application, the user relationships include a predictive component, for future events and competitions, which can be presented using the mapping component.

The invention relates to a computer system for providing a communication and collaboration transactional platform that allows users to interact with a plurality of events and competitions simultaneously.

The sports communication and collaboration transactional platform includes an administrative processor in communication with a network and a plurality of client devices, such as the internet and cell phones respectively.

The sports communication and collaboration transactional platform includes an administrative memory in communication with the administrative processor configured to execute software instructions embodied by the following components: a user interface configured to provide one or more client device and interface to the administrative memory for a user. The administrative memory is a non-evanescent memory or data storage.

The sports communication and collaboration transactional platform includes a plurality of individual user information profiles in the administrative memory comprising: at least one user role, and wherein each user role is selected from the group of: a referee, an event coordinator, a tournament organizer and a player. The plurality of individual user information profiles are created using at least one of the plurality of client devices.

The user interface is configured to provide one or more client devices (a plurality of client devices for engaging a network), each client device for an individual user with access to administrative memory. The user interface includes information accessible to a user and prevents display of information given user roles and user relationships. Each client device provides bidirectional communication to a network.

The sports communication and collaboration transactional platform includes an automatic advance registration component in the administrative memory for tournaments. The automatic advance registration component is configured to match an individual user information profile to at least one of: played tournaments results; a user ranking level; an age level; a current tournaments play sequence; and a tournament organizer authorization.

The sports communication and collaboration transactional platform includes a registration and ranking component in the administrative memory to instruct the administrative processor to match each individual user with one of the sports being played and one of the tournaments for the sport being played in the tournament database model and automatically inserting a ranking level for each individual user into the individual user information profile.

The sports communication and collaboration transactional platform includes a financial component in the administrative memory to instruct the administrative processor to collect funds from individual users matched to one of the tournaments of the tournament database model.

The financial component includes: a digital wallet transition payment protocol for electronic financial transactions enabling each individual user or team to pay for a tournament, a current tournament play sequence, or an event.

The digital wallet transition payment protocol links the system to a finance account associated with an individual user or a team and transfers funds to and from an electronic financial file of the individual user or team using a networked client device and the digital wallet transition payment protocol.

The sports communication and collaboration transactional platform includes an authentication component in the administrative memory to instruct the administrative processor to verify the authenticity of each individual user and provide access to an individual user information profiles for at least one of: the referee, the event coordinator, the tournament organizer and at least two players.

The sports communication and collaboration transactional platform includes a tournament database model in the administrative memory with at least one tournament identification.

The sports communication and collaboration transactional platform includes a mapping component with computer instructions instructing the administrative processor to present in a map, a plurality of locations of current tournaments and a plurality of locations of future tournaments using the automatic advance registration component.

The mapping component includes computer instructions stored in the administrative memory configured to instruct the processor to perform a dynamic check in feature for automatically identifying client devices for a plurality of users simultaneously when users arrive at a tournament.

The sports communication and collaboration transactional platform includes a team creation component in the administrative memory to instruct the administrative processor to match a first individual user information profile to a second individual user information profile using a user ranking level and the age level and automatically form a team for one of the sports being played, save the formed teams in each individual user information profile of the team, and wherein the team creation component further automatically transmits teams to a referee, a tournament organizer and at least two players simultaneously, and optionally to an event coordinator; enabling automatic advance registration for tournaments about to be played.

The sports communication and collaboration transactional platform includes an operational management component in the administrative memory to instruct the administrative processor to automatically create a tournament play sequence using the plurality of formed teams and connect the tournament play sequence to individual user information profiles of the teams in the tournament play sequence.

The sports communication and collaboration transactional platform includes a security model component with computer instructions in the administrative memory instructing the administrative processor to perform automatic encryption of sports results.

A user relationship corresponds to a real-world relationship between users.

Users can be at least one of: an official, a spectator, a competitor, a tournament organizer, a competition organizer, a team of a local club, a local club, a national association, and a sponsor.

In embodiments, the sports communication and collaboration transactional platform has in the administrative memory a relationship management component to instruct the administrative processor to manage and store user relationships between individual users; to automatically determine access rights between at least two individual users and present a customized display comprising individual user information profiles for a prioritized group of individual users.

In embodiments, the user roles can be a member of the group consisting of: an official, a spectator, a team, a local club, a national association, a sponsor, and combinations thereof.

In embodiments, the security model component comprises instructions instructing the processor to encrypt customized displays, individual user information profiles, and user relationships.

In embodiments, the sports communication and collaboration transactional platform includes a certification course in the administrative memory for users to take providing an automatically grading enabling a user with a 70% passing score to become a referee.

In embodiments, the client device is a mobile phone, laptop, tablet, wearable computer or wristwatch.

In embodiments, the financial component includes a platform point system, with computer instructions stored in the administrative memory for instructing the administrative processor to collect points are earned by a player, a team or a non-player with a user role, the collected points are stored in individual user information profiles and the collected points are tradable for items using a sports point exchange model.

In embodiments, each of the plurality of individual user information profiles in the administrative memory connects to a medical server 444 via the network to receive medical histories 445 of individual users.

In embodiments, the authentication component includes a biometric authentication component 101 for individual users, such as retinal file, fingerprint file, voice print file of an individual user.

In embodiments, the registration and ranking component includes computer instructions to automatically request at least one of: a drug screening or a medical waiver enabling an individual user to participate in a tournament or event.

In embodiments, the financial component includes computer instructions instructing the processor to perform a background check for users handling funds transfers for at least one tournament or event.

In embodiments, the dynamic check in feature provides automatic messages to the individual user information profiles automatically tracking arrivals of the plurality of individual users at the tournament.

In embodiments, the dynamic check in feature provides the automatic messages in real time to the administrative processor and the plurality of client devices for automatically tracking of arrivals of the plurality of users at the event or competition.

In embodiments, results can include referee performance acquired using a survey or feedback email to the operational management component.

In embodiments, the digital wallet transition payment protocol enables each user or team to pay for participation in recreational play, club play, team play, tournament play, and league play by individually transferring funds from an individual account such as an account at a bank, or an account associated with PayPal™ or a credit card.

In embodiments, the electronic financial transactions include transferring at least one member of the group consisting of: fiat money, digital financial instruments, currency, and cryptocurrency.

The platform is a sports communication and collaboration transactional platform that allows individual users to interact with a plurality of sports events and sports competitions simultaneously.

In embodiments, the combination of a user role and a user relationship allows the system to automatically determine access rights that presents a customized view for the plurality of the users.

In embodiments, a competition is a sports tournament or another tournament, such as a debate tournament.

In embodiments, the computer system includes a transmission and display component to transmit and display event and competition play for a plurality of users simultaneously.

In embodiments, the transmission and display component connects to at least one web camera, such as a Creative™ web cam, for tracking event and competition play and a video image of the at least one web camera can be viewed in real time on a client device.

In embodiments, the system includes an estimator component to estimate length of time of different tournament games using a quantity of courts, a quantity of competitors, and a ranking level of competitors to produce a list of competitors that can participate in any one tournament.

In embodiments, the system includes a scheduling component that includes a scheduling model for designating competitors and officials into individual geographic locations having a defined date and time in an event or competition.

In embodiments, the system includes a financial component configured to collect funds from one or more users to attend one or more social events connected to at least one of: the event and competition.

A sports communication and collaboration transactional platform that allows individual users to interact with a plurality of sports tournaments, events and sports related activities, such as clinics, all simultaneously.

The tournament database model has at least one tournament identification in the administrative memory. The tournament database model contains the name of sport being played, tournaments for each sport being played, geographic locations of each tournament, user ranking levels, age levels for each of the sports being played; and funds.

The operational management component is configured to create a tournament play sequence and store in the operational management component using the plurality of teams and connecting the tournament play sequence to at least one individual user information profile. The operational management component is also configured to track results of each tournament play sequence and store the results in the operational management component and connect the results to at least one individual user information profile. The operational management component is configured to insert each score of each tournament game played and store the score in the operational management component and connect the score to at least one individual user information profile. The operational management component is configured to calculate a ranking of each individual user, store the ranking in the operational management component, and connect the ranking to at least one individual user information profile.

The connected components form a sports communication and collaboration transaction platform that allows individual users to interact with a plurality of sports events and sports competitions simultaneously.

The sports communication and collaboration transactional platform contains, in the administrative memory, a relationship management component configured to manage and store user relationships between individual users. The relationship management component automatically determines access rights between at least two individual users and presents a customized display including individual user information profiles for a prioritized group of individual users.

The user roles in the sports communication and collaboration transactional platform can be a member of the group including an official, a spectator, a team, a local club, a national association, a sponsor, and combinations thereof.

The sports communication and collaboration transactional platform can also include, in the administrative memory, a security model component with automatic encryption.

The security model component of the sports communication and collaboration transactional platform can also be configured to encrypt customized displays, individual user information profiles, and user relationships.

The mapping component can be additionally configured to plan routes using a global positioning system location of a client device.

The sports communication and collaboration transactional platform can also function if client device is a mobile phone, laptop, tablet, wearable computer or wristwatch.

The mapping component in the sports communication and collaboration transactional platform can be configured to include a dynamic check in feature for automatically identifying client devices for a plurality of users simultaneously when users arrive at a tournament.

The sports communication and collaboration transactional platform can also contain an automatic messaging component to provide automatic messages to either an individual user information profiles or the client devices. The automatic messaging component is configured to create, store in the automatic messaging component, and transmit created messages that a change has taken place to a tournament, information has been added to an individual user information profile, or an individual user has arrived at a tournament.

The administrative memory in the sports communication and collaboration transactional platform can be configured to include a transmission and display component to transmit and display information on tournaments for a plurality of individual users simultaneously.

The sports communication and collaboration transactional platform of can be configured to include at least one web camera for recording and transmitting tournaments and connecting to the transmission and display component enabling individual users to view tournaments in real time on a plurality of client devices simultaneously.

The administrative memory in the sports communication and collaboration transactional platform, can contain an estimator component to first, calculate a length of time for a plurality of tournaments using a quantity of courts with a quantity of individual users, each individual user having a user ranking level and second, produce a list of individual users by user ranking level that can participate during the calculated length of time.

The sports communication and collaboration transactional platform can include a scheduling component having a scheduling model for designating teams and officials for a tournament by the tournament identification.

The sports communication and collaboration transactional platform can contain a scheduling component having a scheduling model for designating teams and officials for a tournament by the tournament identification on at least one of the plurality of maps generated by the mapping component, each tournament scheduled using a date and a time.

The financial component in the sports communication and collaboration transactional platform can be configured to collect funds from one or more users to attend one or more social events affiliated with one of the tournaments.

The tournament database model in the sports communication and collaboration transactional platform can include an administrative fee as part of the funds.

The funds in the sports communication and collaboration transactional platform can include an operational fee.

The team creation component in the sports communication and collaboration transactional platform can generate teams using gender identified in the individual user information profile.

The sports communication and collaboration transactional platform of includes, in the individual user information profile: a team, results, a user ranking level, scores, an age level, a tournament player sequence; and a gender of the individual user.

Turning now to the Figures, FIG. 1 is a diagram of the computer system 10 for providing a sports communication and collaboration transactional platform that allows individual users 89ab to interact with a plurality of events and sports competitions simultaneously.

The system has a plurality of client devices 88a, 88b for engaging a network 14, each client device for an individual user 89a and 89b. Each client device provides bidirectional communication to the network.

Each client device has a GPS transmitter 228a and 228b.

The system includes an administrative processor 12 connected to an administrative memory 16 in communication with the network 14.

In embodiments, the sports communication and collaboration transactional platform has at least one web camera 129 for recording and transmitting tournaments and connecting to a transmission and display component in the administrative memory 16 enabling individual users to view tournaments in real time on a plurality of client devices simultaneously.

At least one financial server 15 connects to the network 14 enabling transfer of funds.

A medical server 444 connects to the network 14 enabling transfer of medical files, drug tests, to the administrative memory and into an individual user profile. The medical server 444 via the network can receive medical histories of individual users.

Each client device 88a and 88b can have a user interface 20a and 20b respectively that can be downloaded from the administrative memory 16. The user interface permits insertion of data, presentation of tournament results, or requesting of data via the administrative processor.

Each client device 88*a* and 88*b* contains a user interface 20*a*, 20*b* that enables individual users to create individual user information profiles 34*a*, 34*b*, in the administrative memory as shown in FIGS. 2A to 2D.

The web camera 129 is in communication with the network for recording and transmitting images to the network 14 for display on one or more of the plurality of client devices all simultaneously.

The financial server 15 is shown connected to the network 14 for transmitting funds to the administrative processor using the client devices 88*a* and 88*b*. In embodiments, the administrative processor 12 can use instructions in administrative memory 16 for disbursing funds to a specific individual user, such as a tournament director.

FIGS. 2A-2D depict a diagram of the administrative memory 16.

The administrative memory 16 has a plurality of downloadable user interfaces 20*a* configured to provide one or more client devices with access to the administrative memory 16. The user interface 20*a* regulates presentation of user information.

The user interface 20 access is managed through an authentication component 100 stored in the administrative memory.

Within the authentication component 100 is a biometric component 101 to authenticate individual uses. The biometric component 101 for individual users can be a biometric file stored in an individual user profile, such as a retinal scan or fingerprint.

The authentication component 100 in the administrative memory 16 verifies the authenticity of each individual user and provides access to an individual user information profile 34.

A plurality of individual user information profiles 34 are stored in the administrative memory, one profile for each individual user or for a team are stored in the administrative memory 16. Each individual user information profile 34 can have at least one user role 32.

User roles can be a tournament organizer 91 and a player 93 a referee 94 and an event coordinator 95.

The plurality of individual user information profiles are created using the client device and the user interface 20*a* and the plurality of individual user information profiles 34 are stored in the administrative memory 16.

In addition to the user roles, the individual user information profile can include collected points 66, a team 193, tournament organizer authorization 194, results 195, a user ranking level 184, scores 197 for each game played, an age level (of the individual user) 186, played tournament results 187, a tournament play sequence 189 showing location of an individual user in the player sequence, a gender 191 of the individual user, Finance account of the user 183, medical history of the user 445, finance account of the team 185, and an electronic financial file 188.

Figure 2A:
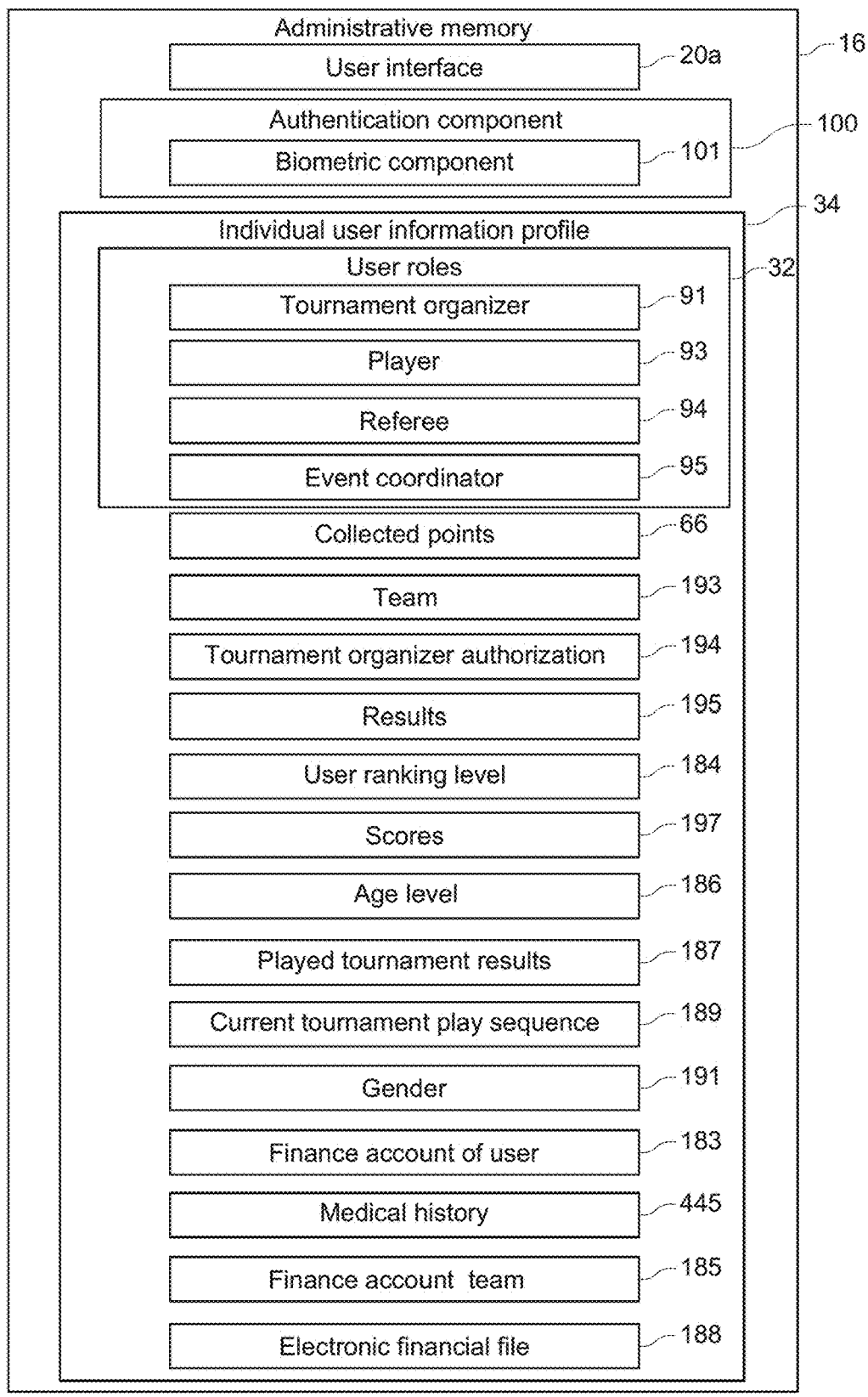
FIGS. 2A to 2D depict a diagram of the administrative memory usable by the platform.
Figure 2B:
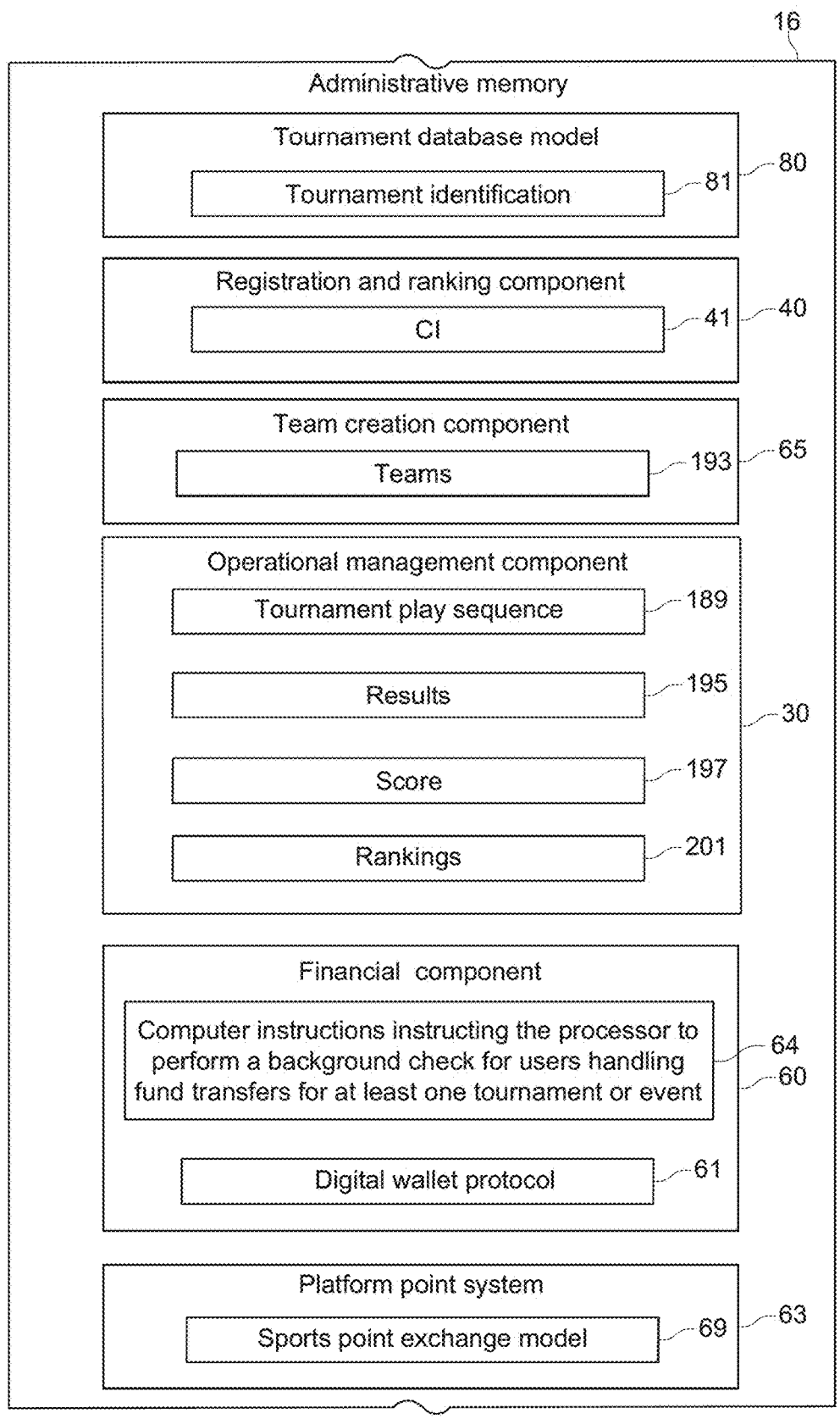

FIG. 2B shows that the administrative memory 16 can contain a tournament database model 80 having tournament identification 81 for individual tournaments.

The administrative memory 16 can have a registration and ranking component 40 matching each individual user with one of the plurality of sports being played and one of the tournaments for the sport being played identified in the tournament database model 80 and automatically inserts a user ranking level 184 for each individual user into the individual user information profile 34.

The registration and ranking component 40 is configured to receive and store individual user information profiles and use computer instructions to automatically insert a user ranking level for a plurality of users using tournament results. Individual user information profiles can include gender 191 for each individual user 89.

Within the registration and ranking component 40 are computer instructions 41 to automatically instruct the administrative processor to request at least one of: a drug screening or a medical waiver for an individual user, enabling an individual user to participate in a tournament or event.

The administrative memory has a financial component 60 configured for collecting funds from individual users 89 matched to one of the events associated with tournaments of the tournament database model by connecting to the financial server 15 connected to the network 14 (shown in FIG. 1), and then transmitting at least a portion of the collected funds 62 to an event coordinator 95 associated with a tournament.

The financial component 60 has a digital wallet transition payment protocol 61 for electronic financial transactions enabling each individual user 89 or team 193 to pay for a tournament, a current tournament play sequence 189 or an event 71 by linking to a finance account associated with an individual user 183, a finance account associated with a team 185 and transferring funds to and from an electronic financial file 188 using a networked client device.

The financial component 60 can be configured to collect funds from one or more users and store at a financial server 15 connected to a financial institution and connected to the network. The funds are used to enable an individual user to participate in at least one of: an event and a competition, and a clinic.

The financial component collects and disburses funds using a connection with the financial server 15 (shown in FIG. 1) connected via the network. The financial component in the administrative server is configured to disperse stored funds to one or more users or the administrative processor and optionally refund funds to one or more users.

The financial component 60 has computer instructions 64 instructing the processor to perform a background check for users handling funds transfers for at least one tournament or event.

The administrative memory has a platform point system 63 with computer instructions for the administrative processor to collect points are earned by a player, a team or a non-player with a user role, the collected points 66 are stored in individual user information profiles (Shown in FIG. 2A) and the collected points 66 are tradable for items using a sports point exchange model 69 as indicated in FIG. 2B.

The administrative memory has a team creation component 65 for establishing teams 193.

The team creation component 65 matches a first individual user information profile 34 to a second individual user information profiles using a user ranking level 184 and an age level 186 and forms a team 193 for one of the sports being played.

The team creation component 65 also, saves the formed teams 193 into individual user information profiles.

The team creation component transmits the teams to at least one of: the tournament organizer 91 and the player 93.

The team creation component 65 enables an individual user information profiles 34 to match to at least one other individual user information profiles based on a user ranking level 184 and age level 186 then automatically forming a team 193 for one of the sports being played in the tournament database model.

The administrative memory has an operational management component 30 the operational management component 30 is configured to: create a tournament play sequence 189 using the plurality of teams 193 and insert the tournament play sequence in at least one individual user information profile.

The operational management component 30 is configured to: track results 195 of each tournament played in the tournament play sequence and insert the results 195 in at least one individual user information profile.

The operational management component 30 is configured to: insert a score 197 of each tournament played by individual user into at least one individual user information profile 34.

The operational management component 30 is configured to calculate a ranking 201 for individual users and insert the ranking in at least one individual user information profile.

The operational management component 30 configured to manage and store a plurality of user roles 32 related to a plurality of events and a plurality of competitions has also been referred to as "a role management component" herein.

The user roles can include a description of a user's rights and responsibilities for accessing at least one of: results of an event, results of a competition and can include one or more of the following: results of a game, results of a tournament, results of club play, results of a competitor, results of league play, results of play by a coach, and results of play by a team manager.

The operational management component 30 can utilize user roles 32 to automatically identify individual user information profiles 34a that the user 89 can access The operational management component 30 performs the following: creates a tournament play sequence using the teams; tracks results of the sport being played by tournament; inserts scores from tournaments into each individual user information profiles 34; calculates a winner which is the result for each tournament, and calculates rankings and insert rankings in each individual user information profiles As an example, the creation of a tournament play sequence using a plurality of teams 193 can be team 1 plays team 3, while team 2 plays team 4, and then the winner of each pairing plays the other winning team.

As an example, the tracking of the results of each sport being played by each team can be team 1 wins against teams 10, 12 and 22. Team 2 loses against teams 5, 6 and 7. Tracking of the results can means tracking only of wins, only of losses, or both wins and losses by team. May times, if two losses occur, the team losing twice is no longer tracked.

As an example, insertion of scores from each sport being played by each team into each individual user information profiles 34 can be the processor saving the total number of wins or total number of losses or total number of both into each individual user information profiles.

As an example, calculation of the results for each sport being played by team can be by type of play, such as mixed doubles, singles, men's doubles, women's, doubles or the like. Age and skill can be factored in. There may be no overall winner for a tournament, only a winner by skill level.

As an example, calculation of rankings and inserting of rankings of the team in each individual user information profiles can be by using a mathematical formula that compares actual play statics to preset skill levels and determines if an individual user fits that preset skill level, then inserts the skill level as a ranking into the individual user information profiles. The insertion can be on a "real time" basis as each game is played.

Figure 2C:
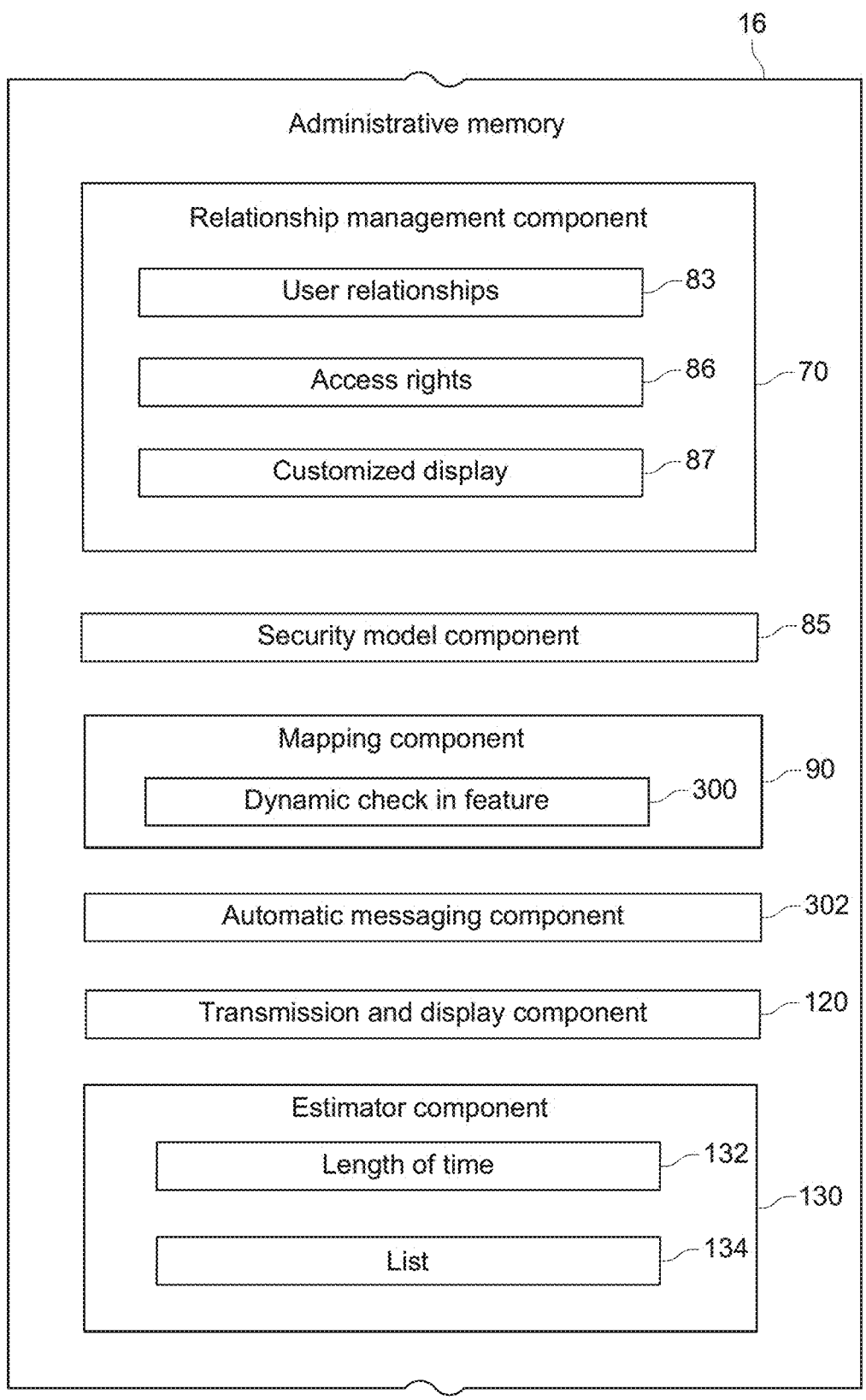

FIG. 2C depicts the sports communication and collaboration transactional platform having in the administrative memory 16, a relationship management component 70 configured to manage and store user relationships 83 between individual users 89; to automatically determine access rights 86 between at least two individual users 89 and present a customized display 87 showing individual user information profiles for a prioritized group of individual users.

In the administrative memory is also a security model component 85 with automatic encryption, the security model component encrypting customized displays 87, individual user information profiles 34, and user relationships 83.

The security model component 85 with encryption 82 is configured to manage access to each user interfaces 20a and 20b, each user role, and each user relationship.

In the administrative memory: a mapping component 90 for presenting in a map 220 locations of current tournaments 222a and 222b and future tournaments 224a and 224b, the mapping component additionally configured to plan routes 226 using a GPS transmitter 228a in the client device 88a.

The mapping component has a dynamic check in feature 300 for automatically identifying client devices using each global positioning system (GPS) transmitter for a plurality of users simultaneously when users arrive at a tournament, and wherein the dynamic check in feature actuates an automatic message component 302 in the administrative memory providing individualized messages to individual user information profiles automatically tracking arrivals of a plurality of individual users at a tournament.

The dynamic check in feature provides automatic messages in real time to the administrative processor 12 and a plurality of client devices 88 for automatically tracking of arrivals of a plurality of users at an event or competition.

The administrative memory 16 shown in FIG. 2C is depicted with a transmission and display component 120 to transmit and display information on tournaments for a plurality of individual users 89 simultaneously.

The transmission and display component is configured to transmit and display information on events and competitions for a plurality of users simultaneously.

The transmission and display component can connect to at least one web camera 129 (shown in FIG. 1) for recording and transmitting event and competition play wherein at least one web camera can be viewed in real time on a plurality of client devices simultaneously.

The administrative memory includes an estimator component 130 to first, calculate a length of time 132 for a plurality of tournaments using a quantity of courts with a quantity of individual users each having a ranking level and second, produce a list 134 of individual users by ranking level that can participate during the calculated length of time.

Figure 2D:
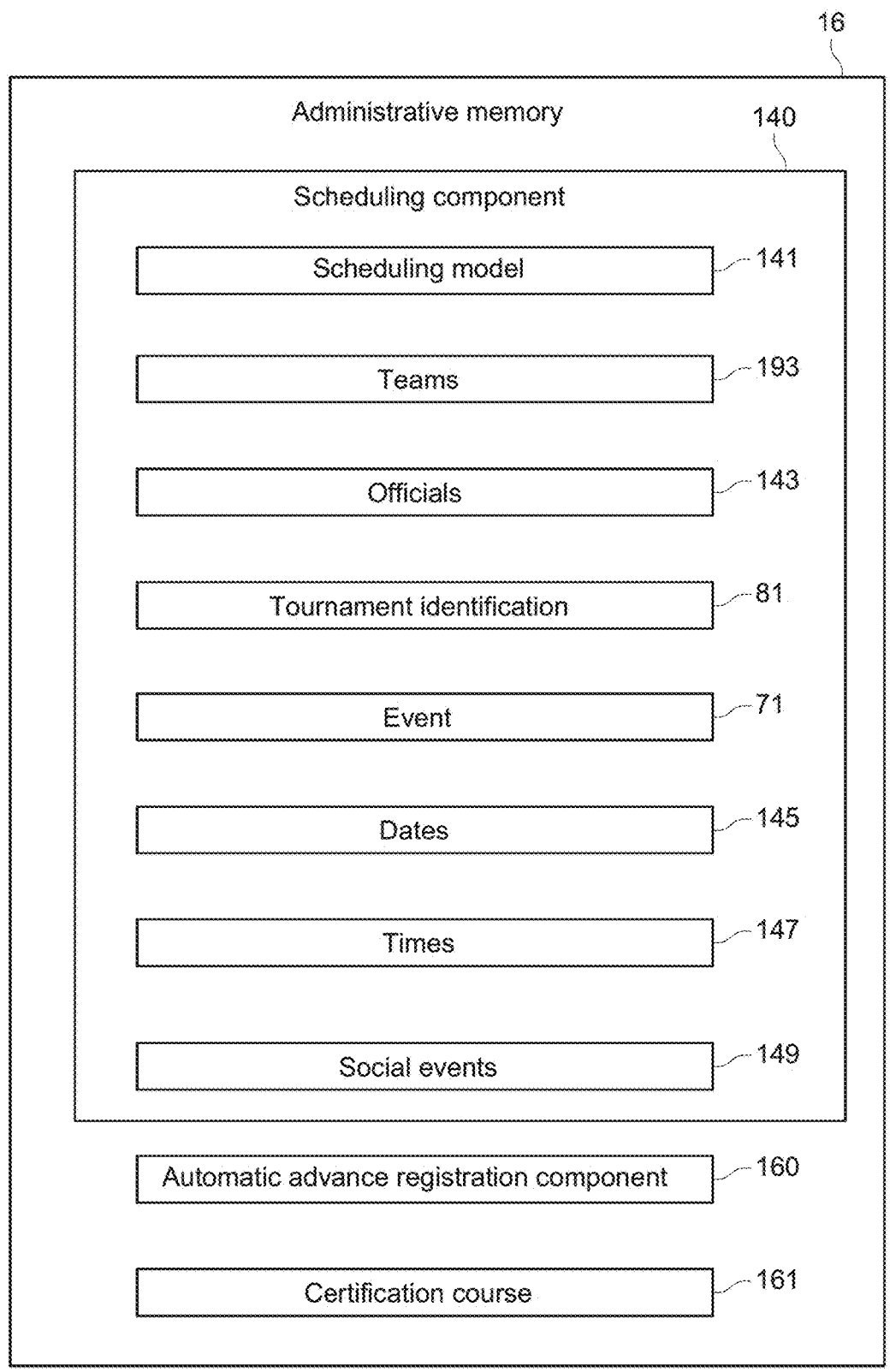

FIG. 2D depicts the administrative memory 16 having a scheduling component 140 containing a scheduling model 141 for designating teams 193, and officials 143 by tournament identification 81 for a plurality of geographic locations and events 71, having a date 145, time 147 and social events 149.

Additionally, the administrative memory 16 also has a mapping component with instructions instructing the processor to present in a map, a plurality of locations of current tournaments and a plurality of locations of future tournaments using the automatic advance registration component 160.

The automatic advance registration component 160 in the administrative memory for tournaments includes computer instructions to instruct the administrative processor to match an individual user information profile to at least one of: played tournaments results 187; user ranking level 184; an age level 186; a current tournaments play sequence 189; and a tournament organizer authorization 194.

The administrative memory 16 can includes a certification course 161 for users to take providing an automatically grading enabling a user with a 70% passing score.

Figure 3:
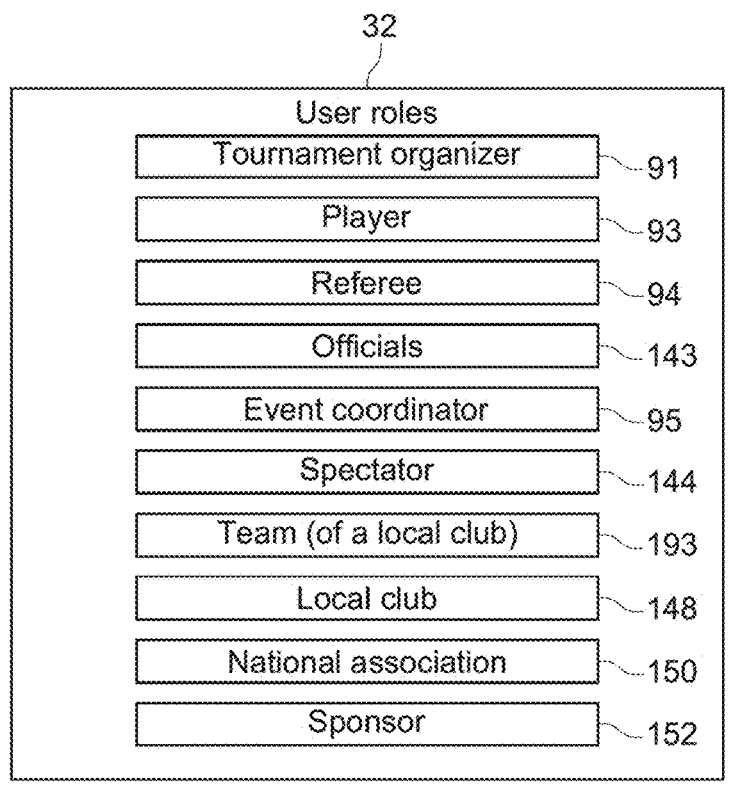
FIG. 3 depicts user roles of the invention.

FIG. 3 depicts user roles 32 for the system which include tournament organizer 91, player 93, referee 94, officials 143, event coordinator 95, a spectator 144, a team (of a local club) 193, a local club 148, a national association 150, a sponsor 152 and combinations thereof.

Figure 4:
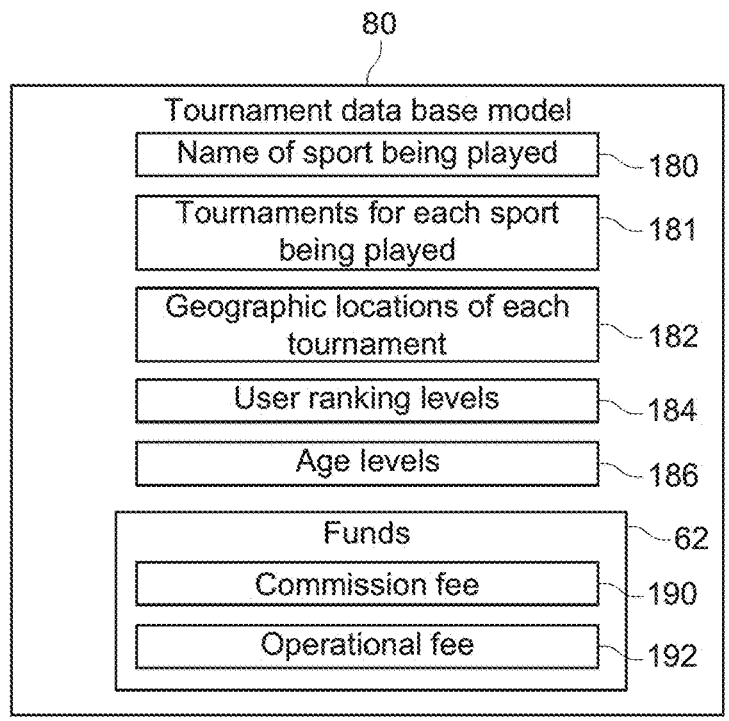
FIG. 4 depicts elements of the Tournament Database model usable herein.

FIG. 4 shows an embodiment of the tournament database model 80 having: a name of sport being played 180; tournaments for each sport being played 181; geographic locations of each tournament 182; user ranking levels 184; age levels 186 for each of the sports being played; and funds 62.

Funds 62 can include a commission fee 190, for example for a $10 per player fee for a tournament with an operational fee 192 for example, an additional $10 per player. A single fee could be collected and divided into an administrative fee 190 and operational fee. For example, $10 could be collected of which $3.00 per person is an administrative fee, leaving $7.00 for use by a tournament director as the operational fee.

As an example, the tournament database model 80 as a name of sport being played 180 could be "pickleball" or a "debate tournament".

The tournament database model 80 may include a geographic location 182 such as the name of a pickleball venue with courts, like Madison Courts, or an address including street, city, state, and zip code.

The tournament database model 80 can include a user ranking level 184 of the tournament such as 3.0 level, 3.5 level, 4.0 level, 4.5 level, and 5.0 level, wherein the 3.0 level refers to beginner level, and 5.0 level refers to expert level, which may include professionals.

The tournament database model 80 includes an age level 186 such as for players of a tournament. For example, an age level could be age 18 and below as a "junior age level", and age 19 and above as an "adult age level". Priority groupings of age levels can also be provided, such as a "senior group" for adults ages 50 and above.

The tournament database model 80 includes a funds 62 for the tournament that can be a single fee that is split, or two different fees enabling users to play in a tournament. The funds can be variable depending on facility, number of events, and number of players. For example, the fee can be $4 per person to a much larger number of $500 per person.

The tournament data base model may include an operational fee 192 to operate a tournament which can be a flat rate per tournament, such as $600 per tournament.

A user relationship can corresponds to a real-world relationship between individual users.

The combination of a user role and a user relationship allows the system to automatically determine access rights that presents a customized view for the plurality of the users.

It should be noted that the mapping component 90 can be configured for presenting current events and competitions and future events and competitions.

The mapping component is configured to plan routes for a plurality of users utilizing global positioning system (GPS) locations of user client devices and real time information providing a communication, collaboration and transactional platform that allows a plurality of users to simultaneously interact with a plurality of events and competitions.

It should be noted that the financial component 60 can be configured to collect funds 62 from one or more users 89 to attend one or more social events 149 connected to at least one of: the event and competition as shown in FIG. 2D.

The sports communication and collaboration transactional platform can use the team creation component to generate teams 193 using gender 191 in the individual user information profile.

In embodiments, the client device is a mobile phone, laptop, tablet, wearable computer or wristwatch that can identify itself with a unique address and a GPS transmitter to provide an individual user location via the network.

Figure 5:
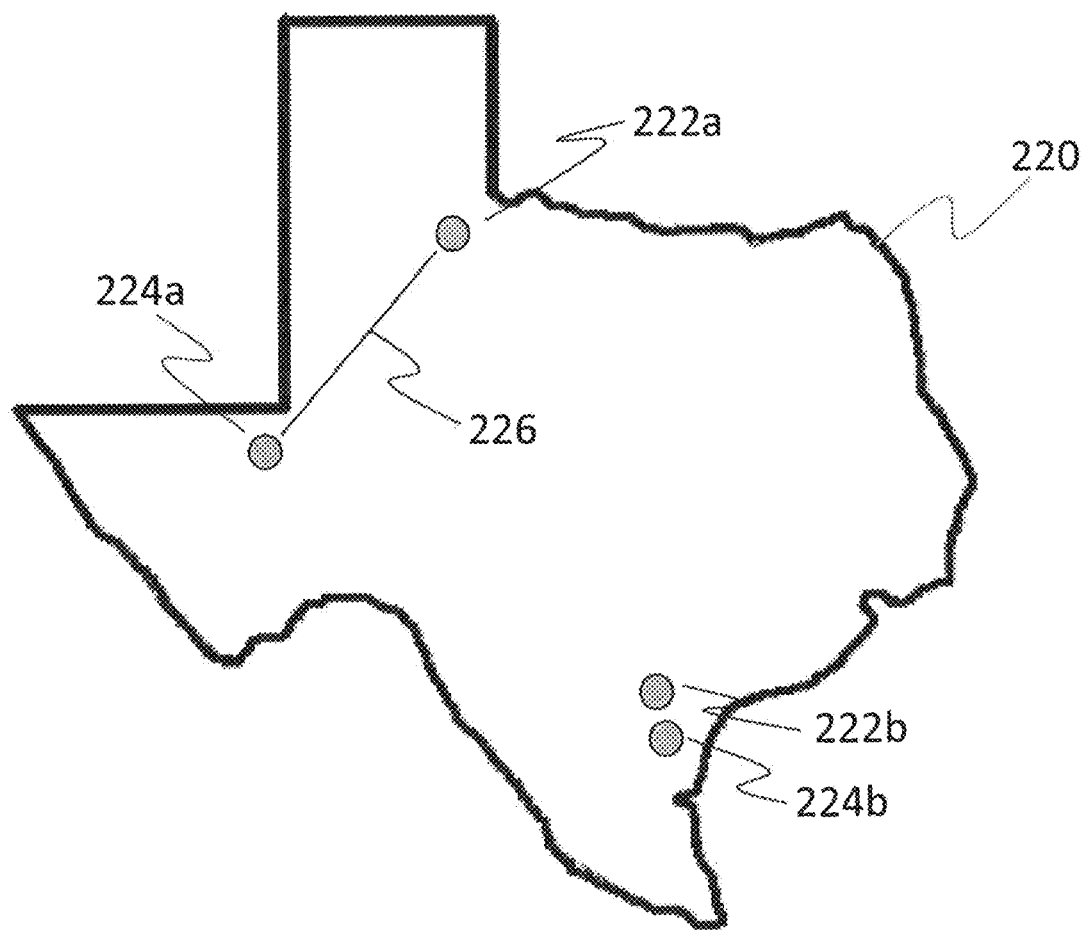
FIG. 5 depicts a map created by a mapping component of the invention.

FIG. 5 depicts the mapping component results with inserted tournaments.

The map 220, which appears to be a map of Texas indicates locations of current tournaments 222*ab* and future tournaments 224*ab*.

The mapping component shows on the map 220 routes 226 between future tournaments 224 and current tournaments using a GPS transmitter in a client device.

In embodiments, the sports communication and collaboration transaction platform includes a platform point system, like a frequent flyer point collection and reward system.

In this embodiment, the collected points (Picklebits™) are earned by a player or non player with a user role. A non-player with a user role can be a referee or other official acting in the sport, but not playing the sport.

The collected points (known as Picklebits™) are stored in individual user information profiles, such as with an automatic counting system or meter showing totals of types of points collected. Points can be classified into different categories.

The collected points can be stored in player or other user role profiles, such as tournament organizer profiles and the stored points can be traded for items, such as branded shirts, coffee cups and airline tickets using a sports point exchange model.

In embodiments, the sports communication and collaboration transactional platform includes in the authentication component a biometric authentication for all user roles.

The biometric authentication can be a retinal scan, a fingerprint, a voice print.

In an embodiment, the sports communication and collaboration transactional platform has computer instructions in the administrative data storage instructing the processor to use information in each of the plurality of individual user information profiles to connect to a medical server connected to the network to download medical histories needed on a user participating in a tournament or event.

In embodiments, the sports communication and collaboration transactional platform includes in the registration and ranking component in the administrative memory to instruct the administrative processor automatically request at least one of drug screening or medical waiver enabling a user to participate in a tournament or event.

For example, the tournament organizer can digitally or on paper request by electronic transfer a drug screening or a medical waiver or a background check enabling a user to participate in play handle funds transfers for each tournament, or participate in an event.

The sports communication and collaboration transactional platform wherein individual players can provide results regarding official performance that referee a match in a tournament using a survey or feedback to the operational management component.

For example, a survey can be a pre-created series of questions enabling a player to rank a referee's actions, such as quick on feet, observing elements of play, and a ranking system of 1 to 5 using a client device such as a cell phone, or laptop, and then transmitting the submitted results via the network to the operational management component in the administrative data storage.

Example 1

A club, the Montrose Club of the Houston Pickleball Association has decided to use the computer system for providing a sports communication and collaboration platform to all their team members and to the La Porte Pickleball Association and Tyler Pickleball Association.

The computer system allows parties affiliated with pickleball to interact.

The Montrose Club of the Houston Pickleball Association has each user log into a processor connected to the internet. The user can be a competitor, George and his team mates, and a sponsor, such as Pack'N' Send.

The user George and his team mates each install a user name and password into the memory associated with the processor. They also enter their user specific details, such as phone numbers, age, and date of birth, national ranking, gender, and emergency contact.

The memory which can be cloud based memory is in communication with the processor, which can be a cloud based processing system is configured to execute software instructions to perform a variety of tasks.

The software presents a user interface configured to provide one or more user interfaces through which users access the computer system.

For George, the user interfaces include information about his current play schedule and results but prevents George from seeing information that is not allowed based on his role and relationship, such as other competitor birthdates, and information from other events.

A role management component in the memory is configured to manage and store one or more user roles such as George's role as event director as well as a competitor.

The role management component describes George's rights and responsibilities for accessing at least one of: results of a game he played in; results of a tournament he organized; schedules for a tournament he is playing in or organizing; and updates to schedules for a tournament he is playing or organizing.

The role management component describes results of Montrose club play which George is a club member.

George can see a total collected money of a tournament George organized. George can see a total collected money for club play if he is the treasurer of the club. George can see a total collected money for league play if his role is league treasurer.

The role management component describes results of league play which are visible to George for all leagues that George participates in.

If George were a coach, he could see all the results of play for all competitors that identify him as a coach. If George is a team manager, he can see all the results of play for all competitors that identify him as a team manager.

The role management component automatically identifies individual user information profiles that the user can access.

For George, a registration and ranking component receives and stores George's individual user information profiles and associates one or more user roles with George, in this case, competitor and club member.

The registration and ranking component automatically inserts a ranking level for George of standing 64 in Texas, from at least one tournament results model managed by the National Pickleball Association that is connected to the memory.

George can view a financial component that is configured to collect funds from George, sponsors, and other competitors in tournaments that George organizes and view the dispersal of funds to one or more users and optionally refund one or more users that do not make play.

George can access a relationship management component to manage and store relationships between users as a user relationship using a relationship database model.

George can see how the results of a tournament affect a ranking system. George can see a current status of tournament games. George can see trouble spots in the schedule with the component.

The relationships of the relationship management component correspond to real-world relationships between George and: officials such as referees for George's schedule tournaments, spectators planning to attend George scheduled tournaments, competitor for George's tournaments, tournament service providers such as concession providers, George can see the names of teams and their local club affiliations which are scheduled to play his tournaments, George can access local club contact information such as president name and phone, George can access national association contact information, and sponsor information.

The combination of George's role and his relationships enable the system to automatically determine access rights that identify a customized view for George.

The system has a security model component with encryption so that George securely manages access to user interfaces, user roles, and user relationships just for him.

George can access a mapping component that provides locations and times for future and past tournaments and related events while presenting calculated ranking levels 42 and user relationships 72 using real time results.

Example 2

The invention is a sports communication and collaboration transactional platform that allows individual users, such as pickleball players in Arizona, Utah, and California, to interact with a plurality of pickleball events, such as pre-event get together or a pickleball clinic, and pickleball competitions such as a women's double and men's doubles simultaneously.

To use the system, each individual user has a client device, such as a laptop, a cell phone or a computerized tablet.

The plurality of client devices all simultaneously engage a network, which can be a cellular network, the internet or both.

Each client device provide bidirectional communication to the network

A cloud based administrative server can be used that has an administrative memory connected to an administrative processor. The administrative server is connected to the network.

100 individual user information profiles are created in the administrative memory for the profiles with 50 people from Utah and 25 people from California and 25 people from Arizona.

Each individual user information profile has at least one user role. The Utah people have an individual that is both a tournament organizer and a player named Jan, The Arizona people have an individual that is both an organizer and a player named Sue, and the Arizona people have an individual that is both an organizer and a player named Roger, all the rest have user roles that are "player." All the individual user information profiles are created by one of the individual users using at least one of the plurality of client devices.

Each individual user uses their client device via the network such as the Internet, to connect to the administrative memory that has an authentication component 100 in verify the authenticity of each individual user and provide access to an individual user information profile. In this example, each player could create a unique user name and unique user password for authentication purposes connected to their name, address and gender. For example, Jan could create the user name "pickleguru" as the password connected to her name, address and gender.

Once authentication, an individual user can connect to a tournament database model in the administrative memory, which contains tournament identifications for upcoming tournament play. The tournament identification can be a name, such as "Spring Fling Pickelball" in Utah or a code such as 35987 which could identify the same tournament, or a different tournament in another state.

The tournament database model contains the name of sport being played, for this example, pickleball, 10 tournaments for pickleball being played in the next 3 months.

The tournament database model contains the geographic locations of each tournament, such as the address of each tournament, like the Downtown YMCA in San Diego, Calif.

The tournament database model contains user ranking levels for the tournament in San Diego which are industry standards, 3.0 each tournament has a ranking level such as 3.5 for the San Diego tournament. Only players with 3.5 or lower in their individual user information profiles can play in the San Diego tournament.

The tournament database model contains age levels for the San Diego tournament, such as only senior players are 50+ years of age.

The tournament data base model provide information on the fund required to play in the San Diego tournament. In this example, there is an administrative fee of $2.00 per player and an operational fee of $18 per player.

In this example, the registration and ranking component matches each of the 100 individual user to one of the tournaments in the tournament database model for pickleball using a pre-play ranking and then after play, the registration and ranking component can automatically confirm the same ranking level or insert a new ranking level for each individual user. For example, Jan can register with the registration and ranking component with a 3.5, and then based on the results of the San Diego competition, the registration and ranking component changes Jan's ranking to 4.0 which is an improved ranking or 3.0 if Jan loses.

During registration using the tournament database model, a financial component receives credit card information all 100 individual users who have been matched to one of the tournaments of the tournament database model.

The financial component connects with a financial server 15, such as Wells Fargo Bank, via a network such as the Internet, collects the two fees, and transmits the administrative fees and the operational fees to a financial institution connected to the administrative memory. The financial component then instructs the bank to transmit a portion of the operational fees to each tournament organizer of a matched tournament matched of the 100 players. Over $30,000 could be collected with $25,000 disbursed using the financial component. For these 100 people 100% of the administrative fees would be held by the administrative memory and 95% of the operational fee could be transmitted to the tournament organizer.

The Utah players can log into the team creation component matching a first individual user information profile of a Utah player to a second individual user information profile from Utah, California or Arizona using a user ranking level and the age level and forming a team for one of the tournaments in the tournament database model. In this example, 50 teams would be made for the combination of Arizona, Utah and California players. In other versions, teams can be more than 2 players for other sports.

Each created pickleball team is stored in the individual user information profile and the team creation component transmitting the lists of created teams each of the three tournament organizers and all of the 100 players.

With the teams now established, the operational management component is used to create a tournament play sequence for each location.

The operational management component is used to track results of each tournament play sequence and store the results in the operational management component 30 and connect the results to at least one individual user information profile. For the 100 players the results of all of their tournaments would be gold medal winners, silver medal winners, and bronze medal winners. The operational management component can store all 10 gold medal winner names, all 10 silver medal winners' names and all 10 bronze medal winner names for the 100 players of this example.

An individual user information profile can be updated with the results of an individual user that is Jan's win of a gold medal can be stored in her individual user profile by date, time and tournament.

The operational management component can insert each score of each tournament game played for each of the 100 players of this example into their respective individual user information profiles.

The operational management component can store all the scores for the 100 players, in the operational management component by match and game, and individual player names.

The operational management component can calculate a ranking for each individual user after the tournament is played for all 100 players. The operational management component can store the rankings in the operational management component. Some rankings may not change. Some rankings may go up, some rankings may go down.

The operational management component can install the ranking update in each individual user information profile.

This sports communication and collaboration transaction platform allows individual users to interact with a plurality of sports events and sports competitions simultaneously.

Example 3

In this example, a sports communication and collaboration transactional platform that allows individual users to interact with a plurality of sports events and sports competitions simultaneously, using a plurality of client devices for engaging a network, each client device for an individual user, each client device providing bidirectional communication to the network. Each user can have a tablet computer.

An administrative memory such as a 128 gigabyte memory can be connected to an administrative processor a Microsoft™ Surface Pro 6 connected to a VPN network.

A plurality of individual user information profiles in the administrative memory have various details in each user role, such as Mary, the referee, who is an official that refereed 80 games and Bill who is an over 70 year old senior player who has played 125 games, Debbie the tournament organizer for the Houston metropolitan area, and Jan who is an event coordinator for fund raising using clinics at tournaments.

Each user role is selected from the group of: a referee, event coordinator, a tournament organizer, and a player.

The plurality of individual user information profiles are created using at least one of the plurality of client devices The administrative memory has an automatic advance registration component for tournaments. The automatic advance registration component is configured to match an individual user information profile to at least one of: played tournaments results; current tournament play sequence, ranking level; age level; and tournament organizer authorization. For example Mary is automatically registered in advance for officiating over a current tournament play sequence. Bill can have automatic advance registration matching Bill using played tournament results, and age level and ranking level. Debbie the tournament is automatically registered in advance for current tournament play sequence and receives tournament organization authorization. Jan the event coordinator is automatically registered in advance for fund raising clinics that occur at the same types as tournaments about to be played.

An authentication component in the administrative memory to instruct the administrative processor to verify the authenticity of each individual user and provide access to an individual user information profile.

The tournament database model with at least one tournament identification in the administrative memory; the tournament database model using the automatic advance registration with a name of sport being played; tournaments for each sport being played; geographic locations of each tournament; user ranking; age levels for each of the sports being played; and funds for the tournament.

The system includes a mapping component with instructions instructing the processor to present in a map, a plurality of locations of current tournaments and a plurality of locations of future tournaments, coordinated with the automatic advance registration. The mapping component includes instructions configured to instruct the processor to perform: a dynamic check in feature for automatically identifying client devices for a plurality of users simultaneously when users arrive at a tournament.

A registration and ranking component in the administrative memory to instruct the administrative processor to match each individual user using the automatic advance registration with one of the sports being played and one of the tournaments for the sport being played in the tournament database model and automatically inserting a ranking level for each individual user into the individual user information profile. For example Bill is matched using the automatic advance registration and the resignation and ranking component to play Fred who is of the same age as Bill, and has a 3 level ranking whereas Bill has a 3.5 level ranking.

A financial component in the administrative memory to instruct the administrative processor to collect funds from individual users matched to one of the tournaments of the tournament database model comprising: digital wallet transition payment protocol for electronic financial transactions enabling each user or team to pay for a tournament or event by linking to a finance account associated with the user or team and transferring funds to and from an electronic financial file using a networked client device For Mary, the referee, the digital wallet transition payment protocol enables here to get paid automatically in Picklebits™ after each match.

For Bill the player, he transfers funds from his Schwab Account™ using the digital wallet transition payment protocol to the current tournament play sequence.

Debbie the tournament organizer for the Houston metropolitan area uses the digital wallet transition payment protocol to receive funds from each player, vendors, and event coordinators for each current tournament about to be played.

Jan who is an event coordinator for fund raising using the digital wallet transition payment protocol to collect money from players for each clinic Jan organizes at each tournament about to be played.

A team creation component in the administrative memory to instruct the administrative processor to match a first individual user information profile to a second individual user information profile using a user ranking level and the age level and automatically forming a team for one of the sports being played, automatically transmitting the teams to at least one of: a referee, event coordinator, a tournament organizer and a player and enabling automatic advance registration for tournaments.

An operational management component in the administrative memory to instruct the administrative processor to automatically: create a tournament play sequence and store in the operational management component using the plurality of teams and connect the tournament play sequence to at least one individual user information profile which can be selected from a referee, an event coordinator, and includes the a tournament organizer and at least two players A security model component with instructions instructing the processor to perform automatic encryption of sports results.

While these embodiments have been described with emphasis on the embodiments, it should be understood that within the scope of the appended claims, the embodiments might be practiced other than as specifically described herein.

What is claimed is:

1. A sports communication and collaboration transactional platform that allows individual users to interact with a plurality of sports events and sports competitions simultaneously, the platform comprising:
   a. a plurality of client devices for engaging a network, each client device for an individual user, each client device providing bidirectional communication to the network;
   b. an administrative memory connected to an administrative processor connected to the network;
   c. a plurality of individual user information profiles in the administrative memory comprising: at least one user role, and wherein each user role is selected from the group of: a referee, an event coordinator, a tournament organizer, and a player, the plurality of individual user information profiles are created using at least one of the plurality of client devices;
   d. an automatic advance registration component in the administrative memory for tournaments configured to match an individual user information profile to at least one of:
      1. played tournaments results;
      2. user ranking level;
      3. an age level;
      4. a current tournaments play sequence; and
      5. a tournament organizer authorization;

e. an authentication component in the administrative memory to instruct the administrative processor to verify the authenticity of each individual user and provide access to an individual user information profiles for at least one of: the referee, the event coordinator, the tournament organizer and at least two players;

f. a tournament database model in the administrative memory, the tournament data base model comprising at least one tournament identification;

g. a mapping component with computer instructions instructing the administrative processor to present in a map, a plurality of locations of current tournaments and a plurality of locations of future tournaments using the automatic advance registration component; wherein the mapping component comprises computer instructions configured in the administrative memory to instruct the administrative processor to perform: a dynamic check in feature for automatically identifying client devices for a plurality of users simultaneously when users arrive at a tournament;

h. a registration and ranking component in the administrative memory to instruct the administrative processor to match each individual user with one of the sports being played and one of the tournaments for the sport being played in the tournament database model and automatically inserting a ranking level for each individual user into the individual user information profile;

i. a financial component in the administrative memory to instruct the administrative processor to collect funds from individual users matched to one of the tournaments of the tournament database model; the financial component comprising: a digital wallet transition payment protocol for electronic financial transactions enabling each individual user or team to pay for a tournament, a current tournament play sequence, or an event by linking to a finance account associated with an individual user or a team and transferring funds to and from an electronic financial file using a networked client device;

j. a team creation component in the administrative memory to instruct the administrative processor to match a first individual user information profile to a second individual user information profile using a user ranking level and the age level and automatically forming a team for one of the sports being played, saving the teams in the individual user information profile and the team creation component and automatically transmitting the teams to a referee, a tournament organizer and at least two players and optionally an event coordinator; and enabling automatic advance registration for tournaments about to be played;

k. an operational management component in the administrative memory to instruct the administrative processor to automatically create a tournament play sequence using the plurality of teams and connect the tournament play sequence to at least one individual user information profile; and l. a security model component with instructions instructing the processor to perform automatic encryption of sports results.

2. The sports communication and collaboration transactional platform of claim 1, comprising in the administrative memory a relationship management component to instruct the administrative processor to manage and store user relationships between individual users; to automatically determine access rights between at least two individual users and present a customized display comprising individual user information profiles for a prioritized group of individual users.

3. The sports communication and collaboration transactional platform of claim 1 wherein user roles can be a member of the group consisting of: an official, a spectator, a team, a local club, a national association, a sponsor, and combinations thereof.

4. The sports communication and collaboration transactional platform of claim 3, comprising a certification course in the administrative memory for users to take providing an automatically grading enabling a user with a 70% passing score to become a referee.

5. The sports communication and collaboration transactional platform of claim 3, wherein the registration and ranking component comprises computer instructions to automatically request at least one of: a drug screening or a medical waiver enabling an individual user to participate in a tournament or event.

6. The sports communication and collaboration transactional platform of claim 3, wherein the financial component comprising computer instructions instructing the processor to perform a background check for users handling funds transfers for at least one tournament or event.

7. The sports communication and collaboration transactional platform of claim 3, wherein results include referee performance acquired using a survey or feedback email to the operational management component.

8. The sports communication and collaboration transactional platform of claim 1, wherein the security model component comprises instructions instructing the processor to encrypt customized displays, individual user information profiles, and user relationships.

9. The sports communication and collaboration transactional platform of claim 1, wherein the client device is a mobile phone, laptop, tablet, wearable computer or wristwatch.

10. The sports communication and collaboration transactional platform of claim 1, wherein the financial component comprises a platform point system, with computer instructions for the administrative processor to collect points are earned by a player, a team or a non-player with a user role, the collected points are stored in individual user information profiles and the collected points are tradable for items using a sports point exchange model stored in the administrative memory.

11. The sports communication and collaboration transactional platform of claim 1, wherein each of the plurality of individual user information profiles in the administrative memory connects to a medical server via the network to receive medical histories of individual users.

12. The sports communication and collaboration transactional platform of claim 1, wherein the authentication component comprises a biometric component for individual users.

13. The sports communication and collaboration transactional platform of claim 1, wherein the dynamic check in feature provides automatic messages to the individual user information profiles automatically tracking arrivals of the plurality of individual users at the tournament.

14. The sports communication and collaboration transactional platform of claim 1, wherein the dynamic check in feature provides the automatic messages in real time to the administrative processor and the plurality of client devices for automatically tracking of arrivals of the plurality of users at the event or competition.

15. The sports communication and collaboration transactional platform of claim 1, wherein the digital wallet transition payment protocol enables each user or team to pay for participation in recreational play, club play, team play, tournament play, league play by individually transferring funds.

16. The sports communication and collaboration transactional platform of claim 15, wherein the electronic financial transactions comprises: at least one member of the group comprising: fiat money, digital financial instruments, currency, and cryptocurrency.

* * * * *